US009137456B2

(12) United States Patent
Wong

(10) Patent No.: US 9,137,456 B2
(45) Date of Patent: Sep. 15, 2015

(54) INTELLIGENT AUTO-EXPOSURE BRACKETING

(75) Inventor: Earl Q. Wong, Vallejo, CA (US)

(73) Assignee: Apple Inc., Cupertino, CA (US)

(*) Notice: Subject to any disclaimer, the term of this patent is extended or adjusted under 35 U.S.C. 154(b) by 474 days.

(21) Appl. No.: 13/490,099

(22) Filed: Jun. 6, 2012

(65) Prior Publication Data
US 2013/0329092 A1 Dec. 12, 2013

(51) Int. Cl.
H04N 5/235 (2006.01)

(52) U.S. Cl.
CPC .................... H04N 5/2356 (2013.01)

(58) Field of Classification Search
None
See application file for complete search history.

(56) References Cited

U.S. PATENT DOCUMENTS 7,239,757 B2 * 7/2007 Kang et al. ............ 382/274
2008/0187235 A1 * 8/2008 Wakazono et al. .......... 382/255

OTHER PUBLICATIONS

Kang, Sing Bing, Matthew Uyttendaele, Simon Winder and Richard Szeliski. "High Dynamic Range Video" Interactive Visual Media Group. Microsoft Research, Redmond, WA.

* cited by examiner

Primary Examiner — Twyler Haskins
Assistant Examiner — Angel L Garces-Rivera
(74) Attorney, Agent, or Firm — Blank Rome LLP

(57) ABSTRACT

Techniques to adaptively select bracket settings during auto-exposure bracket (AEB) operations are described. In general, AEB settings for a current image may be based on the evaluation of prior bracketed images. For example, the current exposure setting established by an auto-exposure mechanism (EV0) may be compared with a prior EV0 image. If the two are consistent, the prior image's lower and upper f-stop setting images (EV− and EV+) may be used to adaptively change the bracket settings for the current image's EV− and EV+ images. In another implementation, the most recently obtained EV− and EV+ images may be used to adaptively change the bracket settings for the current image—no prior capture being necessary.

16 Claims, 7 Drawing Sheets

INTELLIGENT AUTO-EXPOSURE BRACKETING

BACKGROUND

This disclosure relates generally to the field of digital image processing. More particularly, this disclosure relates to auto-exposure bracketing operations. Many digital cameras provide a user with an auto-exposure bracketing (AEB) option. Under this option, a number of pictures (generally 3, 5 or 7) are captured at different exposures settings, which are typically uniformly spaced. Under extremely challenging imaging/auto-exposure conditions, users can employ the AEB option to increase the probability of acquiring an optimally exposed picture.

Another use of the AEB option is during high dynamic range (HDR) imaging. In order to create a high quality HDR image, the full dynamic range of a scene needs to be captured (specifically, highlight and shadow information). Unfortunately, the dynamic range of a scene often exceeds the dynamic range of the camera's imaging sensor, which are typically limited to capturing 256 (8 bits) to 1024 (10 bits) levels of brightness. In order to address this shortcoming, AEB may be employed. The most commonly employed brackets are: 2EV−, EV0, 2EV+ and 3EV−, EV0, 3EV+. Here, "EV" stands for exposure value and refers to a combination of the camera's shutter speed and aperture setting. The EV0 image refers to an image captured using an exposure value as determined by the camera's auto-exposure (AE) algorithm, EV− refers to an image captured at a lower stop (e.g., 2 or 3), and EV+ refers to an image captured at a higher stop (e.g., 2 or 3). In practice, fixed bracketing schemes (such as the two listed above), are not able to capture quality images for all possible illumination conditions. If the brackets are set too large, the likelihood of excessive noise and motion blur in the lower and upper bracketed images increases. If the brackets are set too small, the likelihood of clipped information in the lower and upper bracketed images increases.

SUMMARY

In one embodiment the inventive concept provides a method to adaptively change the lower and upper bracket settings during AEB operations. The method begins by capturing first neutral (EV0), low and high bracketed images. (As used herein, a neutral image is one that is captured using an exposure value provided by an image capture device's auto-exposure process.) At some later time, a second neutral image may be obtained and evaluated against the first neutral image. If the two primary images are determined to be consistent, quality metrics may be determined for one or both of the high and low exposure bracket settings and used to establish new exposure bracket settings. The new exposure bracket settings may then be used to capture new neutral, low and high bracketed images. The collection of images so captured may be fused to generate a composite image (either immediately or later). A computer executable program to implement the method may be stored in any media that is readable and executable by a programmable control device and may be in any desired computer programming language. The disclosed capabilities may also be implemented in an electronic device having the ability to capture digital images.

In another embodiment, lower and upper bracket settings may be adaptively changed by obtaining first low and high images using first low and high exposure bracket settings. A histogram may be obtained for either or both of these low and high images based, for example, on luminescence or the R, G, B color channels. When an indication is received to capture an image afterwards, quality metrics may be determined for one or both of the first low and high images (e.g., based on their histograms). If the quality metrics so indicate, one or both of the low and high exposure bracket settings may be adjusted. For example, if either of the first low or high images have an excessive number of blown-out pixels, the respective exposure bracket setting may be adjusted to compensate for this condition. A new set of images based on the adjusted low and high exposure bracket settings (as well as a corresponding neutral image) may be captured and fused (immediately or later) into a composite image.

Computer executable programs to implement the disclosed methods may be stored in any media that is readable and executable by a programmable control device. Such programs may be implemented in any desired computer programming language. In addition, the disclosed capabilities may also be implemented in an electronic device having the ability to capture digital images.

DETAILED DESCRIPTION

Figure 1A:
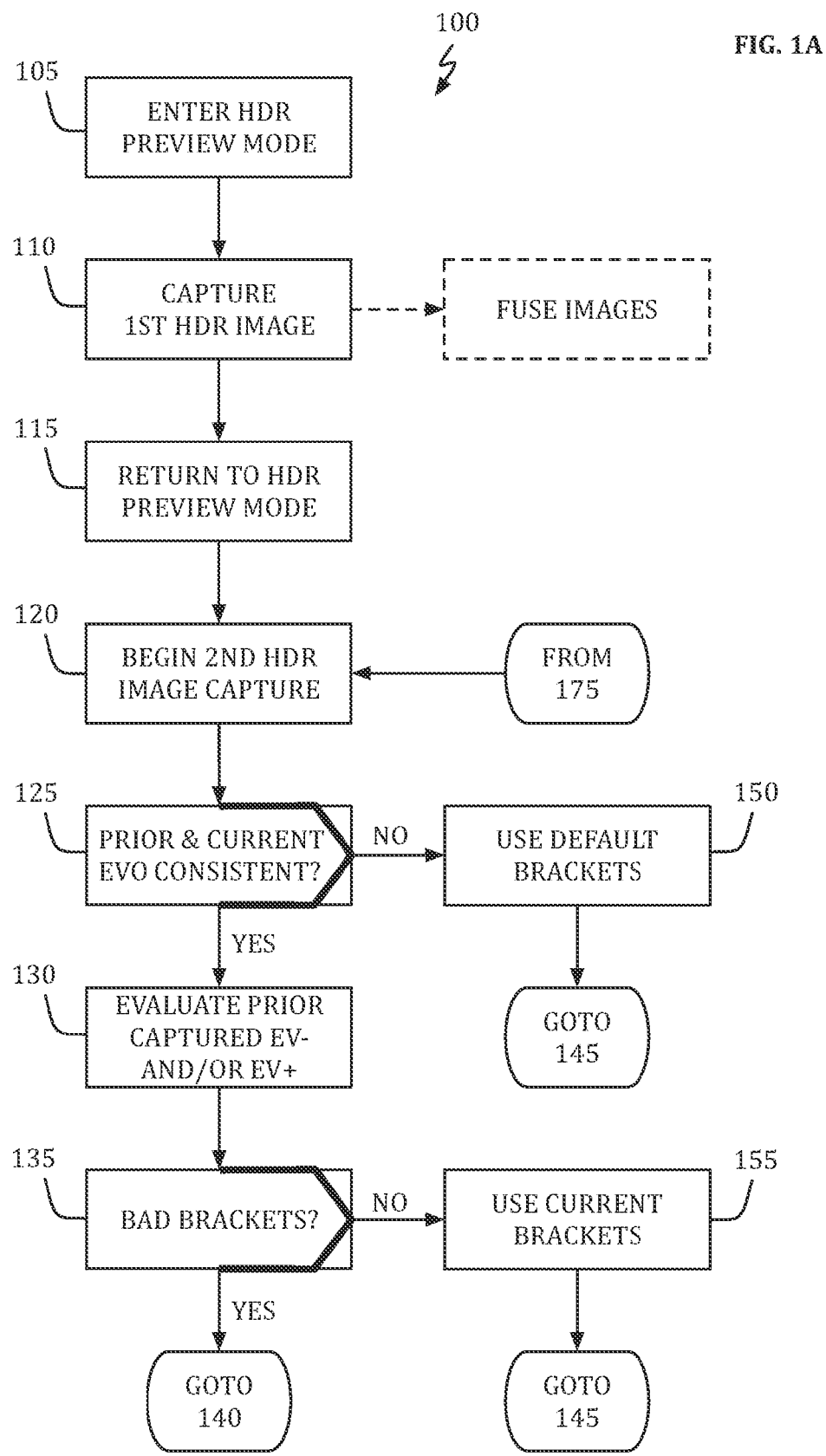
FIGS. 1A and 1B show, in flowchart form, an intelligent auto-exposure bracketing operation in accordance with one embodiment.

This disclosure pertains to systems, methods, and computer readable media for implementing methods to adaptively select bracket settings during AEB operations. In general, techniques are disclosed for adjusting AEB settings for a current image based on the evaluation of prior bracketed images. In some embodiments, the current EV0 image may be compared with a prior EV0 image. If the two are determined to be consistent, the prior image's EV− and/or EV+ images may be used to adaptively change the bracket setting for the current image. As previously noted, the EV0 image refers to the image captured using the exposure value as determined by the camera's auto-exposure (AE) mechanism. The EV− image refers to that image captured by the lower f-stop setting in an AEB capture operation, and the EV+ image refers to that image captured by the higher f-stop setting in an AEB capture operation. As used here, the term "consistent" refers to the concept of two images being similar. Information or parameters that may be used to determine if two images are consistent can include, but are not limited to: timestamp; camera location (e.g., via GPS data); camera directional information; camera exposure; and color histogram data. More particularly, techniques disclosed herein may analyze a prior image's EV− and/or EV+ histograms. Those that contain a significant number of pixels that are either too bright or too dark (i.e., are "blown-out") may be taken as indicative that a change in bracket exposures are needed. In such cases, either or both EV− and EV+ bracket exposure settings may be adjusted so as to reduce the number pixels that are too bright and/or too dark. When the EV−, EV0, and EV+ images are fused (such as during HDR operations), the resulting image may have an improved dynamic range over that obtained using conventional AEB techniques.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

In many modern digital capture devices, there is a state known as "preview-mode" during which the device repeatedly obtains images from it's sensor and displays those for a user to see. It will be recognized that the displayed image is often smaller than the sensor's capture capacity (e.g., 1 or 2 MPix versus 5 or 8 MPix). While the specific rate at which the preview image is obtained and displayed may be dependent upon the particular type of sensor element (e.g., charged-coupled device or complementary metal-oxide semiconductor) and supporting circuitry, typical display rates are currently between 15 and 30 frames-per-second.

Figure 1B:
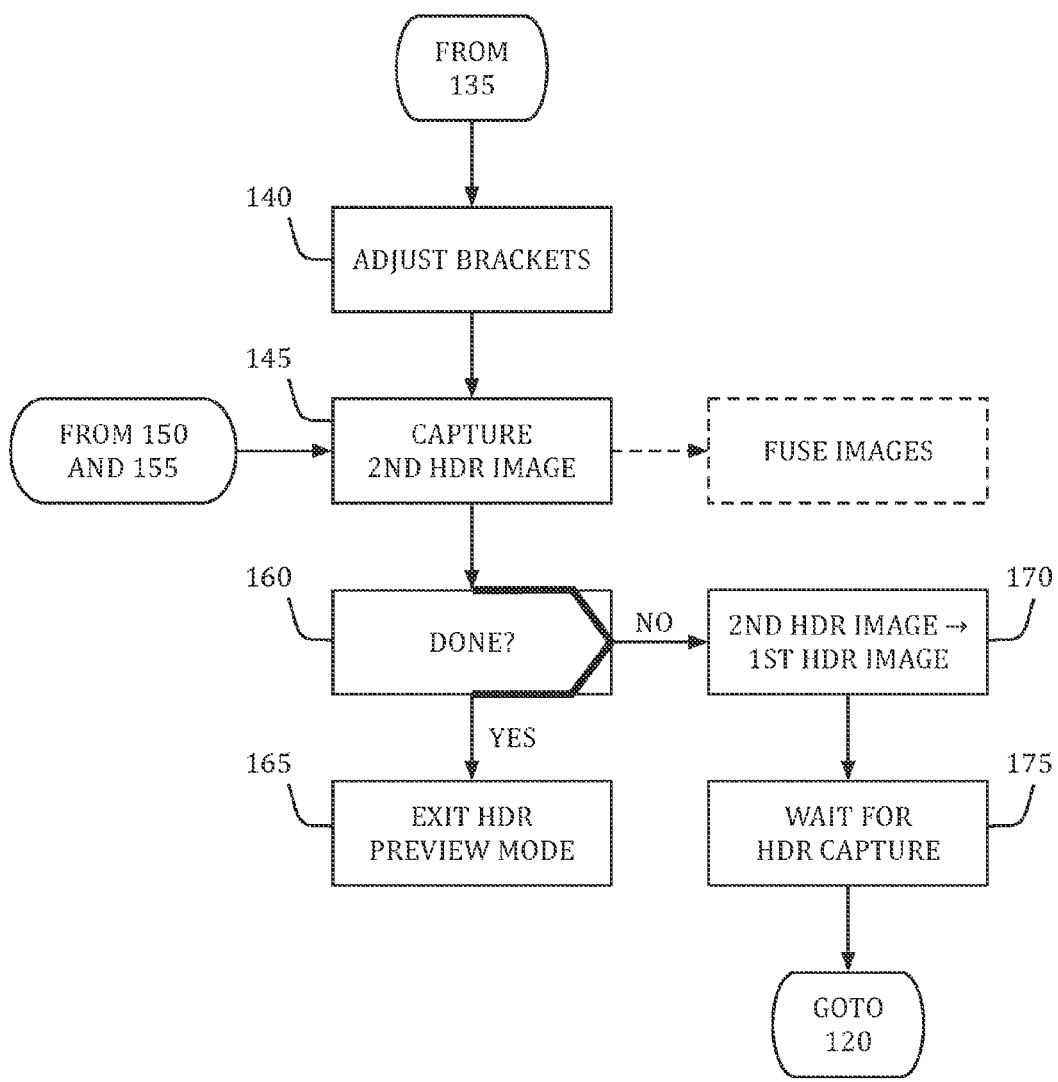
Figure 2:
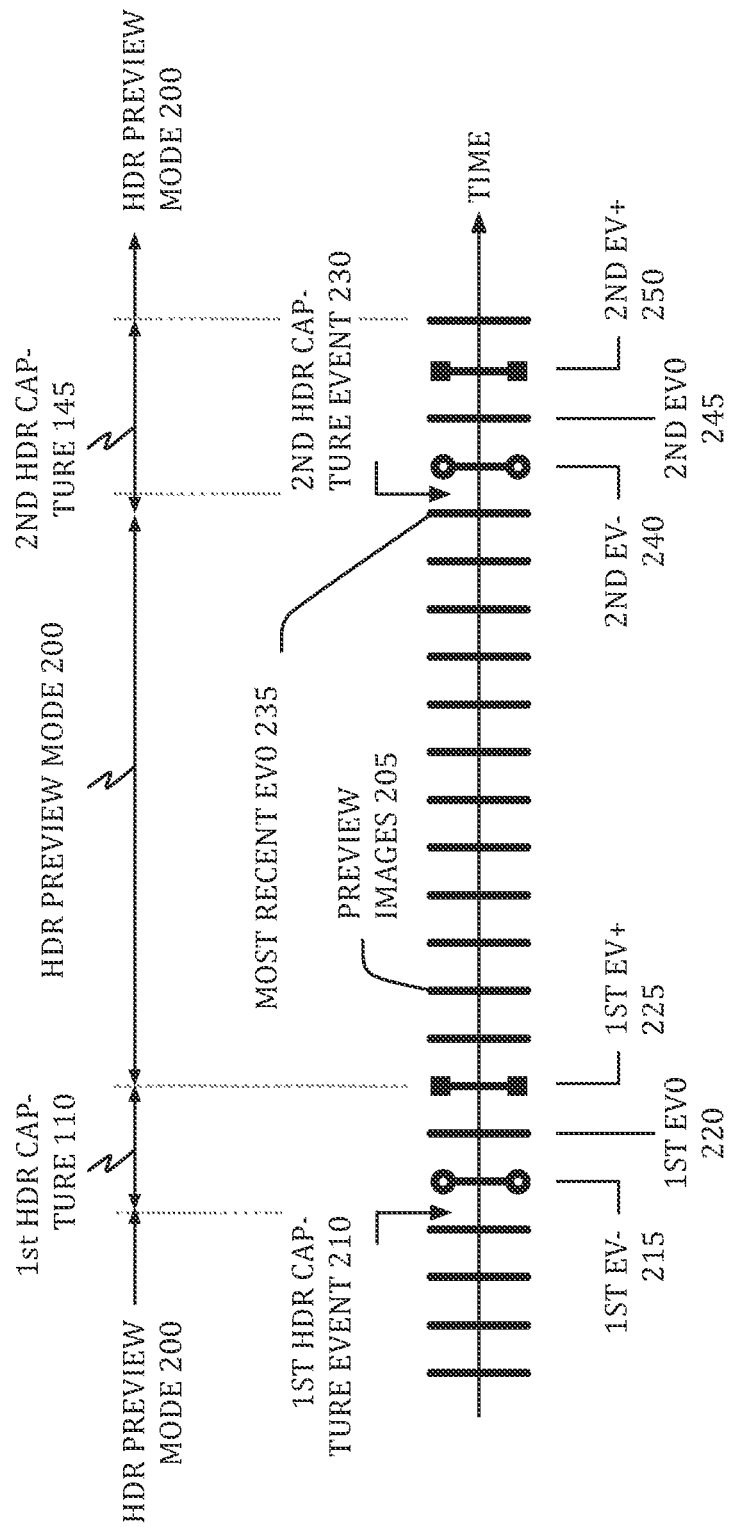
FIG. 2 shows an illustrative intelligent auto-exposure bracketing timeline in accordance with FIGS. 1A and 1B.

One application of an intelligent auto-exposure bracketing (iAEB) operation in accordance with this disclosure is during HDR acquisition. Referring to FIGS. 1A, 1B, and 2, illustrative iAEB operation 100 begins when an image capture device is placed into HDR preview mode 200 (block 105). At that time, the device begins to obtain and display preview images 205 taken at some rate (e.g., 15 to 30 frames-per-second) and some exposure as determined by the device's AE mechanism. As used herein, the term "obtained" means that the image capture device's sensor has acquired an image without an intent to store the image in long-term memory/storage. In contrast, the term "captured" means that the image capture device's sensor has acquired an image with an intent of storing it in long-term memory/storage. Along with the image data itself, each preview image may also include metadata of the sort that may be used to determine its consistency with other images. Such metadata may be incorporated within the image's file structure or be retained in a separate data store with a reference between the two (e.g., using one- or two-way pointers). Consistency data may include, but is not limited to: timestamp; camera location from, for example, GPS data; camera directional information such as that available from accelerometer and/or gyroscopic sensors; camera exposure; and color histogram data (which is frequently used in QBIC and CBIR systems to determine similarity/dis-similarity between image pairs).

At some later point in time, first HDR capture event 210 occurs (block 110). In the illustrated embodiment, first HDR capture event 210 causes three images to be acquired: first EV− image 215, first EV0 image 220, and first EV+ image 225. After capturing this first set of HDR images, the device may return to HDR preview mode 200 (block 115). In addition, HDR images 215, 220 and 225 may be fused into a single HDR image (shown in dashed line fashion). At yet a later time, second HDR capture event 230 may occur that begins an intelligent bracket adjustment operation in accordance with this disclosure (block 120). On event 230, most recently obtained EV0 image 235 may be evaluated to determine if it is consistent to prior captured EV0 image 220 (block 125). In one embodiment, two images may be considered consistent if they are taken within 10 seconds of one another and have exposure values differing by no more than ½ stop. In another embodiment, two images may be considered consistent if the image capture device's orientation changed less than ±5° between the time the two images were captured. In still another embodiment, two images may be considered consistent if they were taken at the same location. In yet other embodiments, combinations of these characteristics may be used; the precise selection of which will depend upon the developer's specific goals. If most currently obtained EV0 image 235 is consistent with prior captured EV0 image 220 (the "YES" prong of block 125), prior captured EV− and/or EV+ images 215 and 225 may be evaluated (block 130). In one embodiment, evaluation in accordance with block 130 may include determining how many blown-out pixels are in prior captured EV− and/or EV+ images 215 and 225. In many image capture devices this information, in the form of histograms, may be obtained. Histogram information may come in a variety of forms such as, for example, luminance (e.g., when operating in the YUV/YCbCr colorspace) or color (e.g., red, green, or blue when operating in the RGB colorspace). In one embodiment, any pixel having a value greater than X (e.g., in EV− image 215) or less than Y (e.g., in EV+ image 225) may be counted as "blown-out." Values for X and Y may be selected by a designer to meet the particular needs and constraints of their implementation (e.g., 251 or 255 for X and 0 or 6 for Y).

Once the number of blown-out pixels in prior captured EV− and/or EV+ images 215 and 225 are known, a determination may be made as to whether the AEB brackets used to obtain them were "good" (block 135). The precise number of blown-out pixels needed to be considered "bad," may be influenced by a number of factors. Illustrative factors include, but are not limited to, the size of image being captured (e.g., 3 MPix versus 10 MPix), where during image processing histogram data is obtained (see discussion below), the image's exposure value, and the particular sensor and image processing pipeline within the device being used to generate the images. Accordingly, the number of blown-out pixels may be compared to a threshold and if that threshold is exceeded (the "YES" prong of block 135), the brackets may be adjusted (block 140). Consider, for example, an image sensor that returns 8-bit quantities (0 to 255). If the EV− image has a large number of blown-out high pixels (e.g., pixels having a value equal to or greater than a first specified value), this may be at least partially compensated for by stepping the bracket for the EV− image down (e.g., from −1 EV to −1.5 EV, or from −2 EV to −3 EV). Similarly, if the EV+ image has a large number of blown-out dark pixels (e.g., pixels having a value less than or equal to a second specified value), this may be at least partially compensated for by stepping the bracket for the EV+ image up (e.g., from +1 EV to +1.5 EV, or from +2 EV to +3 EV). In another embodiment, upper and lower bracket settings may be adjusted independently: e.g., −1 EV to −2 EV for the EV− image and +2 EV to +2.5 EV for the EV+ image. In yet another embodiment, only one side of an AEB bracket need be adjusted. For example, if a particular embodiment experiences most bracketing problems due to blown-out bright pixels, only the EV− image need be evaluated or changed. Similarly, if a particular embodiment experiences most bracketing problems due to blown-out dark pixels, only the EV+ image need be evaluated or changed. Once the bracket(s) are adjusted in accordance with block 140, second HDR image may be obtained (block 145), resulting in second EV− image 240, second EV0 image 245, and second EV+ image 250.

If most currently obtained EV0 image 235 is not consistent with prior captured EV0 image 220 (the "NO" prong of block 125), AEB brackets may be set to their default value (block 150), where after iAEB operation 100 continues at block 145. If evaluation in accordance with block 135 determines the current exposure brackets are good (the "NO" prong of block 135), the AEB brackets may be left at their current value (block 155), where after iAEB operation 100 continues at block 145. In one embodiment, after each HDR image capture the EV− and EV+ images may be returned to their default setting (e.g., ±2 EV, or ±3 EV). In another embodiment, the AEB bracket settings may be left at whatever value they were last set to. In yet another embodiment, AEB brackets may initially be left at their current values, reverting to their default values after a stipulated event (e.g., the elapse of a specified time, a change in image capture device orientation or location).

Once second HDR image set 240, 245 and 250 have been obtained in accordance with block 145, a check may be made to determine if HDR capture activities are complete (block 160). In addition, HDR images 240, 245 and 250 may be fused into a single HDR image (shown in dashed line fashion). If it is determined that HDR capture activities are complete (the "YES" prong of block 160), HDR preview mode 200 may be left (block 165). On the other hand, if it is determined that HDR capture activities are not complete (the "NO" prong of block 160), the second HDR image set (images 240, 245 and 250) may be made the first HDR image set (block 170), where after a wait state may be entered until another HDR capture event is detected (block 175). When such an event occurs, iAEB operation 100 continues at block 120.

In another embodiment, the HDR preview mode may obtain EV−, EV0, and EV+ images in a cyclic fashion. One benefit of this approach is that each HDR image capture may evaluate the most recent EV− and EV+ images rather than looking back to the last captured HDR image, thereby allowing the HDR capture process to use the most up-to-date exposure information. Another advantage of this approach is that consistency checks between current and prior EV0 images may be eliminated. While most any sequence of EV−, EV0, and EV+ images may be employed, only the EV0 image is generally shown on an image capture device's display element.

Figure 3:
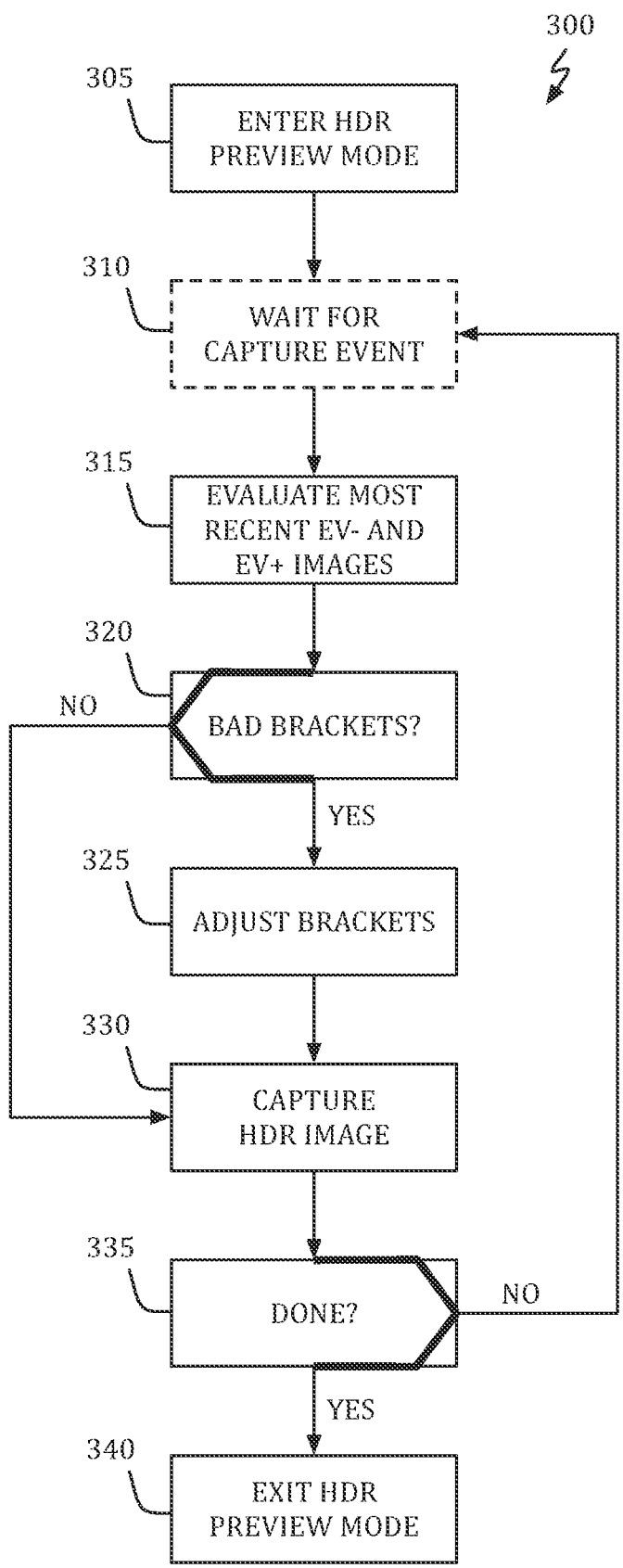
FIG. 3 shows, in flowchart form, an intelligent auto-exposure bracketing operation in accordance with another embodiment.
Figure 4:
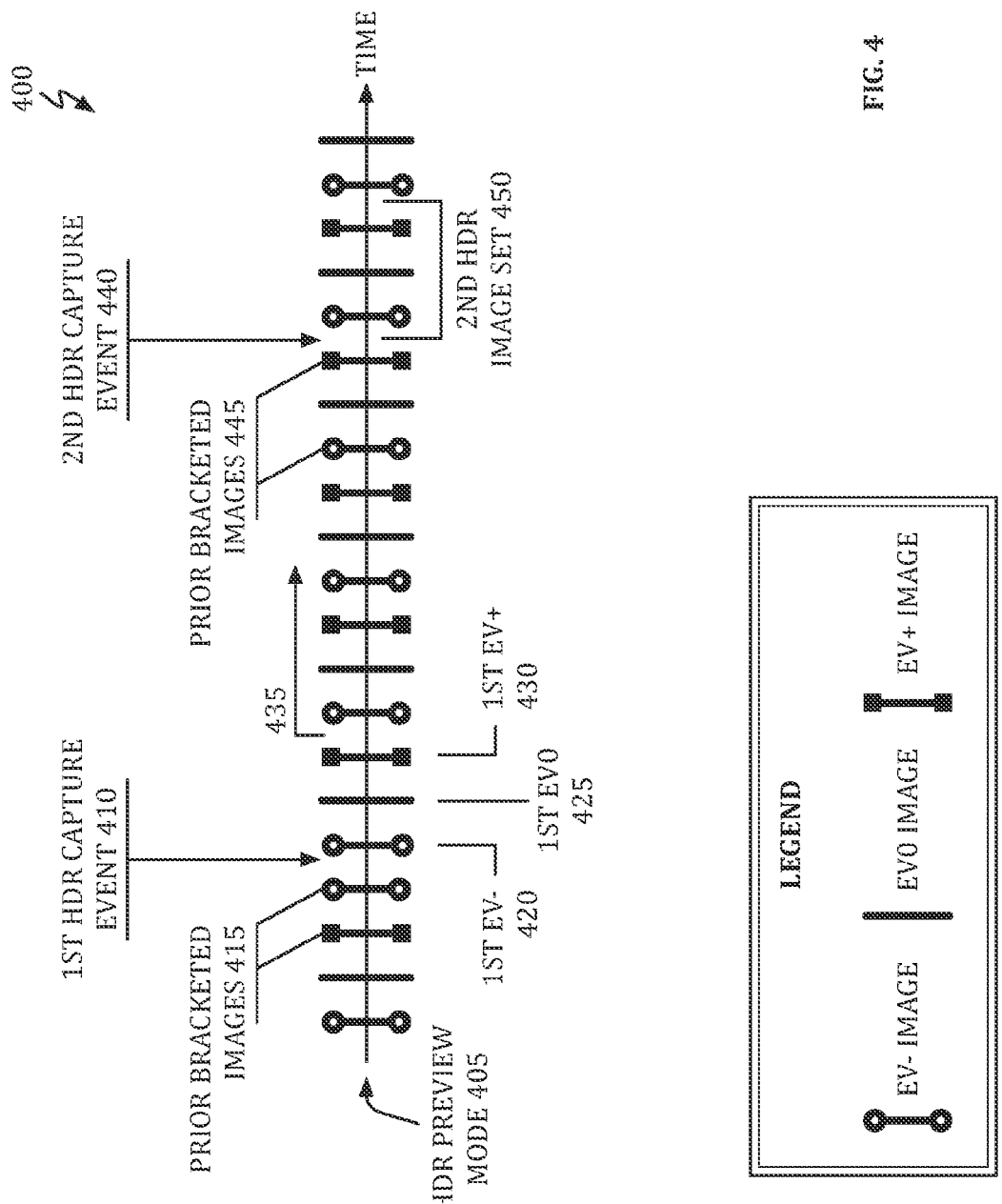
FIG. 4 shows an illustrative intelligent auto-exposure bracketing timeline in accordance with FIG. 3.

Referring to FIGS. 3 and 4, illustrative iAEB operation 300 cyclically obtains EV−, EV0, and EV+ images. As shown in timeline 400, example iAEB operation 300 obtains an EV− image followed by an EV0 image followed by an EV+ image. In this embodiment, once the image capture device is placed into HDR preview mode 405 (block 305), a wait state may be entered (block 310). During this time, the image capture device obtains EV−, EV0, and EV+ images at some rate (e.g., 20 frames-per-second), with EV0 images being captured using the exposure setting determined by the device's AE mechanism.

At some later time, when first HDR capture event 410 occurs, the most recently obtained EV− and EV+ images 415 may be evaluated (block 315). Evaluation in accordance with block 315 may include determining how many blown-out pixels are in prior obtained EV− and/or EV+ images 415. In practice this information may be generated by camera firmware and attached to each image as it moves along the image processing pipeline (see discussion below with respect to FIG. 5). Once this is done, a determination may be made as to whether the current brackets are "good" (block 320). If evaluation of EV− and/or EV+ images 415 determines that one or both bracket settings should to be adjusted (the "YES" prong of block 320), such adjustment may be made (block 325). Evaluation and adjustment in accordance with blocks 320 and 325 may be performed as described above with respect to blocks 130 and 135 in FIG. 1. With proper bracket settings, first EV− image 420, first EV0 image 425 and first EV+ image 430 may be captured (block 330). If, on the other hand, the bracket settings used to capture prior EV− and EV+ images 415 are determined to be "good" (the "NO" prong of block 320), EV−, EV0, and EV+ images 420-430 may be captured immediately (block 330). In one embodiment, following the capture of HDR image set 420-430 in accordance with block 330, the bracket settings used to obtain subsequent images 435 may be default bracket settings. In another embodiment, the bracket settings used to obtain subsequent images 435 may be the "current" bracket settings. In this latter embodiment, if block 330 is arrived at via the "NO" prong of block 320, the bracket settings used to obtain subsequent images 435 will be the same bracket settings as was used to obtain prior images 415. However, if block 330 was arrived at via the "YES" prong of block 320, subsequent images 435 may be obtained using the bracket settings set in accordance with block 325.

Following capture of the first HDR image set (images 420-430), a test may be made to determine if the HDR mode should be terminated (block 335). In one embodiment, HDR mode may be terminated by an explicit act of a user (e.g., the user actively turns HDR mode off). In another embodiment, HDR mode may be terminated automatically in accordance with a specified event (e.g., the passage of time). If it is determined that the HDR mode should be terminated (the "YES" prong of 335), it is so terminated (block 340). If it is determined that the HDR mode should not be terminated (the "NO" prong of 335), iAEB operation 300 continues at block 310. At some time after the capture of HDR images 420-430, second HDR image capture event 440 may occur. Again, the most recent EV− and EV+ images 445 may be evaluated (block 315) for purposes of determining what bracket setting should be used to capture second HDR image set 450 (blocks 320-330). Following capture of HDR image set 450, iAEB operation 300 continues at block 335 as described above.

Figure 5:
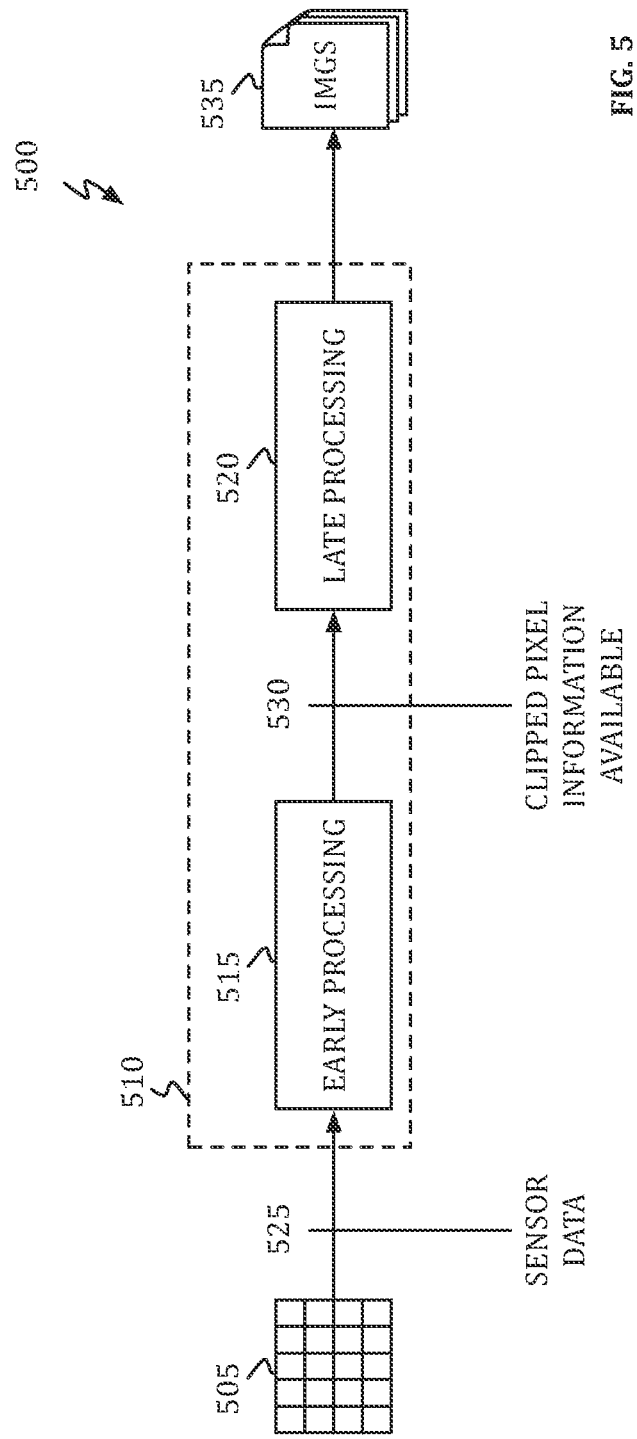
FIG. 5 shows, in block diagram form, an image processing pipeline in accordance with one embodiment.

Referring to FIG. 5, illustrative image capture subsystem 500—such as may be found in a mobile device having an embedded camera—includes sensor 505 and image processing pipeline 510, itself composed of early and late stage processing units 515 and 520. In practice, image subsystem 500 may be composed of hardware (e.g., special and/or general purpose processing units), software (e.g., firmware), or a combination hardware and software. Raw sensor data 525 may be initially operated upon by early stage processing unit 515. In one embodiment, unit 515 may provide dead pixel correction (and other sensor and/or lens accommodation operations), and white balancing functions. As shown, once early-stage processing has completed, image capture subsystem 500 may provide clipped pixel information 530; typically in the form of a histogram. This information may be used to determine the number of pixels in EV− and/or EV+ that are blown-out (see discussion above). Further processing by unit 520 may provide image sharpening, gamma correction, and noise reduction. Output from image subsystem 500 may include multiple images 535 (e.g., EV−, EV0, and EV+ images). Once obtained in accordance with this disclosure, image set 535 may be fused to generate a single HDR output image or saved to memory/storage for later fusion or other processing. It will be recognized that clipped pixel information may also be obtained from image processing pipeline 510 output (e.g., from images 535).

Due to the additional treatment provided by late-stage processing unit 520, the threshold used to determine whether the brackets used to capture prior EV− and EV+ images (e.g., 215, 225, 240 and 250 in FIG. 2 or 415 and 445 in FIG. 4) are good or bad in accordance with blocks 130-135 (see FIG. 1) or 315-320 (see FIG. 3) may be different. In one embodiment, if sensor 505 provides 8 Mpix images the blown-out pixel threshold using clipped pixel information 530 may be 15,000 pixels while the blown-out pixel threshold using pipeline 510's output (e.g., from images 535) may be 10,000 pixels. In another embodiment, the thresholds may be a function (e.g., a percentage) of the number of pixels provided by sensor 505. In yet another embodiment, the threshold applied to an EV− image may be different from that applied to an EV+ image.

Figure 6:
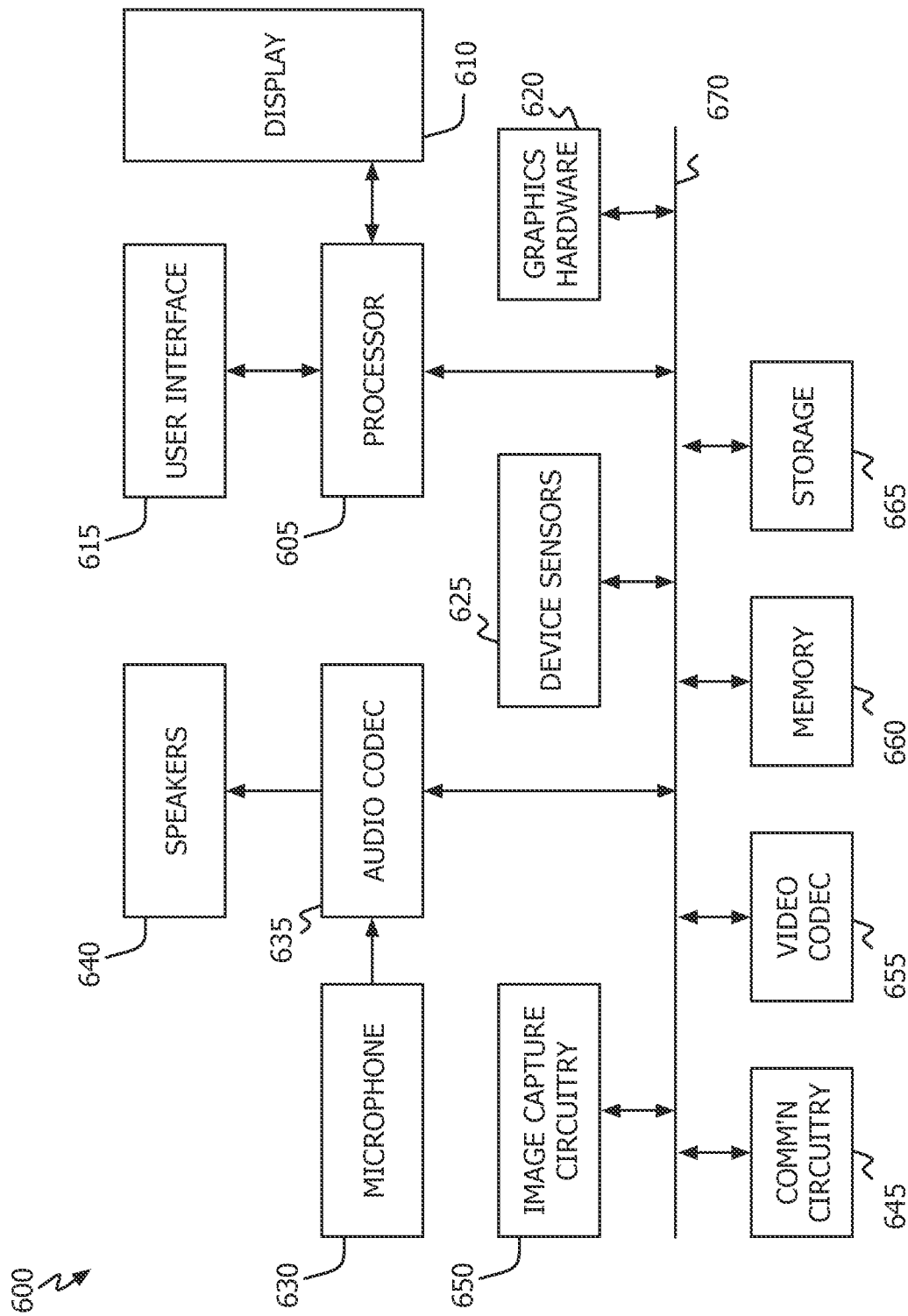
FIG. 6 shows, in block diagram form, an electronic device in accordance with one embodiment.

Referring to FIG. 6, a simplified functional block diagram of illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a personal digital assistant (PDA), personal music player, a mobile telephone, or a notebook, laptop or tablet computer system.

Processor 605 may execute instructions necessary to carry out or control the operation of many functions performed by device 600 (e.g., such as the generation and/or processing of images in accordance with operations 100 and 300). Processor 605 may, for instance, drive display 610 and receive user input from user interface 615. User interface 615 can take a variety of forms, such as a button, keypad, dial, a click wheel, keyboard, display screen and/or a touch screen. Processor 605 may be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 process graphics information. In one embodiment, graphics hardware 620 may include a programmable graphics processing unit (GPU).

Sensor and camera circuitry 650 may capture still and video images that may be processed to generate images in accordance with this disclosure and may, for example, incorporate image capture subsystem 500. Output from camera circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. For example, the capture of EV− and EV+ images are not to be limited to one each. In some embodiments, 2 or more EV− images (using different exposure values) and/or two or more EV+ images (using different exposure values) may be used. In addition, many different image capture orders may be used. For example, the EV0 image may be captured first followed by the EV− image followed by the EV+ image. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:

obtain a first primary image, a first low image using a first low exposure bracket setting, and a first high image using a first high exposure bracket setting; obtain a first low histogram for the first low image;

receive an indication that a second primary image is to be captured;

obtain a first preview image;

determine that the first primary image is consistent with the first preview image, wherein the determination that the first preview image is consistent with the first preview image comprises a determination that the first primary image was obtained within a predetermined threshold time interval of when the first preview image was obtained;

determine at least one quality characteristic for the first low image based, at least in part, on the first low histogram;

establish a second low exposure bracket setting based, at least in part, on the determined quality characteristic; and capture the second primary image, a second low image and a second high image based, at least in part, on the second low exposure bracket setting.

2. The non-transitory program storage device of claim 1, wherein the instructions to cause the processor to determine at least one quality characteristic comprise instructions to cause the processor to determine a first number of pixels identified in the first low histogram corresponding to a first blown-out condition.

3. The non-transitory program storage device of claim 2, wherein the instructions to cause the processor to establish a second low exposure bracket setting comprise instructions to cause the processor to establish a second low exposure bracket setting that is different from the first low exposure bracket setting when the first number of pixels in the first low histogram identified as having a first blown-out condition is greater than a first value.

4. The non-transitory program storage device of claim 3, wherein the first low exposure bracket setting corresponds to a first f-stop and the second low exposure bracket setting corresponds to a second f-stop, wherein the second f-stop is lower than the first f-stop.

5. The non-transitory program storage device of claim 3, further comprising instructions to cause the processor to return the second low exposure bracket setting to the first low exposure bracket setting after the second primary image is captured.

6. The non-transitory program storage device of claim 5, wherein the first low exposure bracket setting corresponds to a default low exposure bracket setting.

7. The non-transitory program storage device of claim 1, further comprising instructions to cause the processor to fuse the second primary image, the second low image and the second high image into an output image.

8. The non-transitory program storage device of claim 1, wherein the instructions to cause the processor to obtain a first low histogram further comprises instructions to cause the processor to obtain a first high histogram for the first high image.

9. The non-transitory program storage device of claim 8, wherein the instructions to cause the processor to determine at least one quality characteristic further comprise instructions to cause the processor to determine a second number of pixels identified in the first high histogram corresponding to a second blown-out condition.

10. The non-transitory program storage device of claim 9, wherein the instructions to cause the processor to establish a second low exposure bracket setting further comprise instructions to cause the processor to establish a second high exposure bracket setting that is different from the first high exposure bracket setting when the second number of pixels in the first high histogram identified as having a second blown-out condition is greater than a second value.

11. The non-transitory program storage device of claim 10, wherein the first high exposure bracket setting corresponds to a first high f-stop and the second high exposure bracket setting corresponds to a second high f-stop, wherein the second high f-stop is higher than the first high f-stop.

12. The non-transitory program storage device of claim 11, further comprising instructions to cause the processor to return the second high exposure bracket setting to the first high exposure bracket setting after the second primary image is captured.

13. The non-transitory program storage device of claim 12, wherein the first high exposure bracket setting corresponds to a default high exposure bracket setting.

14. An electronic device, comprising:
an image sensor;
a memory operatively coupled to the image sensor; and
at least one processor operatively coupled to the memory and the image sensor, wherein the at least one processor is configured to execute instructions stored in the memory to cause the at least one processor to—
obtain a first primary image, a first low image using a first low exposure bracket setting, and a first high image using a first high exposure bracket setting,
obtain a first low histogram for the first low image;
receive an indication that a second primary image is to be captured;
obtain a first preview image;
determine that the first primary image is consistent with the first preview image, wherein the determination that the first primary image is consistent with the first; preview image comprises a determination that the first preview image was obtained with the electronic device oriented in a first orientation that is within a predetermined orientation difference threshold of a second orientation of the electronic device when the first primary image was obtained;
determine at least one quality characteristic for the first low image based, at least in part, on the first low histogram,
establish a second low exposure bracket setting based, at least in part, on the determined quality characteristic, and
capture the second primary image, a second low image and a second high image based, at least in part, on the second low exposure bracket setting.

15. The electronic device of claim 14, further comprising a display element, wherein the memory further comprises instructions to cause the at least one processor to:
fuse the second primary image, the second low image and the second high image into an output image; and
show the output image on the display unit.

16. An adaptive auto-exposure bracketing method, comprising:
obtaining a first primary image, a first low image using a first low exposure bracket setting, and a first high image using a first high exposure bracket setting;
obtaining a first low histogram for the first low image;
receiving an indication that a second primary image is to be captured;
determining that the first primary image is consistent with the first preview image, wherein the determination that the first primary image is consistent with the first preview image comprises a determination that the first primary image was obtained at a first location within a predetermined threshold distance of a second location where the first preview image was, obtained;
determining at least one quality characteristic for the first low image based, at least in part, on the first low histogram;
establishing a second low exposure bracket setting based, at least in part, on the determined quality characteristic; and
capturing the second primary image, a second low image and a second high image based, at least in part, on the second low exposure bracket setting.

* * * * *